(12) United States Patent
Shin

(10) Patent No.: US 10,808,751 B2
(45) Date of Patent: Oct. 20, 2020

(54) TILTING-PAD BEARING

(71) Applicant: HANWHA POWER SYSTEMS CO., LTD, Changwon-si (KR)

(72) Inventor: Seung Hoon Shin, Changwon-si (KR)

(73) Assignee: HANWHA POWER SYSTEMS CO., LTD, Changwon-si (KR)

( * ) Notice: Subject to any disclaimer, the term of this patent is extended or adjusted under 35 U.S.C. 154(b) by 0 days.

(21) Appl. No.: 16/408,842

(22) Filed: May 10, 2019

(65) Prior Publication Data

US 2019/0345976 A1 Nov. 14, 2019

(30) Foreign Application Priority Data

May 11, 2018 (KR) .................. 10-2018-0054163

(51) Int. Cl.
*F16C 17/03* (2006.01)
(52) U.S. Cl.
CPC .................... *F16C 17/03* (2013.01)
(58) Field of Classification Search
CPC ................. F16C 17/03; F16C 17/06
See application file for complete search history.

(56) References Cited

U.S. PATENT DOCUMENTS

2015/0049969 A1\* 2/2015 Rudolph ................. F16C 17/03
384/117
2017/0045082 A1\* 2/2017 Rockefeller ............ F16C 17/03

FOREIGN PATENT DOCUMENTS

JP 2015010672 A \* 1/2015 .......... F16C 33/1045

OTHER PUBLICATIONS

Machine Translation of JP-2015010672-A (Year: 2015).\*

\* cited by examiner

*Primary Examiner* — Alan B Waits
(74) *Attorney, Agent, or Firm* — Sughrue Mion, PLLC

(57) ABSTRACT

A tilting-pad bearing includes: a tilting pad having a tilting surface; and a housing comprising a supporting surface supporting the tilting surface. One of the tilting surface and the supporting surface is configured as a cam profile surface so that the tilting pad is tilted smoothly in response to the rotor rotating.

18 Claims, 7 Drawing Sheets

100

TILTING-PAD BEARING

This application claims priority under 35 U.S.C § 119 to Korean Patent Application No. 10-2018-0054163 filed on May 11, 2018 in the Korean Intellectual Property Office, the disclosure of which is incorporated herein by reference in its entirety.

BACKGROUND

1. Field

Apparatuses consistent with exemplary embodiments relate to a tilting-pad bearing, and more particularly, to a tilting-pad bearing in which a contact surface between a tilting pad and a housing forms a cam profile.

2. Description of the Related Art

A tilting-pad bearing is a type of fluid bearings, which is designed to transfer loads from a rotating body with minimum power loss, and may include a plurality of tilting pads being assembled therein. When a tilting-pad bearing is operating, a fluid (e.g., oil) is introduced into a pad surface of the tilting pads by viscous drag to form a thin, compressed film. The load is supported by the oil film, and the tilting pads are slightly inclined according to the load applied to the oil film. The inclination of the tilting pads change according to the load applied to the bearing and the rotation speed of the rotating body.

FIG. 1 shows a tilting-pad bearing of the related art disclosed in, for example, Japanese Laid-open Patent Publication No. 2016-217443. The tilting-pad bearing 100 of the related art includes tilting pads 110 for supporting a rotor 130 (a rotating body), and a housing 120 in which the tilting pads 110 are mounted. In the tilting-pad bearing 100 of the related art, a tilting surface 111 of each of the tilting pads 110 and a supporting surface 121 of the housing 120 are circular.

The displacement of the tilting pads 110 in the tilting-pad bearing 100 of the related art will be described with reference to FIG. 2. FIG. 2 illustrates the displacement of a trailing edge 113 of the tilting pad 110 as the rotor 130 rotates in the tilting-pad bearing 100. Because the tilting surface 111 and the supporting surface 121 are formed in a circular shape, the magnitude of the rotation angle of the rotor 130 and the displacement of the trailing edge 113 have linear relationships at the rise 210 and the fall 230. Therefore, the line 200 of the displacement of the trailing edge 113 does not vary smoothly but rather has abruptly changing linear sections.

Accordingly, the displacement of the trailing edge 113 is not smoothly varied when the transition from the rise 210 to the dwell 220 and the transition from the dwell 220 to the fall 230 are performed. That is to say, the tilting pads 110 cannot be tilted smoothly. Accordingly, the tilting surface 111 of the tilting pads 110 and the supporting surface 121 of the housing 120 may be worn out because a strong force is suddenly applied to the tilting pads 110 when the rotor 130 abruptly starts and stops.

Accordingly, there is proposed herein a tilting-pad bearing that overcomes the shortcomings of existing tilting-pad bearings.

SUMMARY

One or more exemplary embodiments provide a tilting-pad bearing is capable of reducing the wear occurring between the tilting surface of each of the tilting pads and the supporting surface of the housing. More specifically, one or more exemplary embodiments provide a tilting-pad bearing in which tilting pads have a smooth motion in a transition section (for example, from the rise to the dwell or from dwell to the fall).

It should be noted that objects of the inventive concept in the disclosure are not limited to the above-mentioned object; and other objects of the inventive concept will be apparent to those skilled in the art from the following descriptions.

According to an aspect of an exemplary embodiment, there is provided a tilting-pad bearing including: a tilting pad having a tilting surface; and a housing including a supporting surface supporting the tilting surface. One of the tilting surface and the supporting surface is configured as a cam profile surface so that the tilting pad is tilted along a curvature in response to the rotor rotating.

The other one of the tilting surface and the supporting surface may be formed in a circular shape.

The cam profile surface may be configured such that the tilting pad is tilted in one of a cycloid motion, a simple harmonic motion or a constant acceleration motion.

The tilting pad may include: a trailing edge located at a front end of the rotor in a rotation direction; and a leading edge located at a rear end opposite to the front end of the rotor in the rotation direction.

A displacement of the trailing edge may be changed according to a rotation angle of the rotor.

The displacement of the trailing edge may form a cycloid curve.

The tilting pad may be tilted according to a cycloid curve motion of the displacement of the trailing edge.

The tilting surface may include a concave surface, and The supporting surface may include a convex surface.

The tilting surface may include a convex surface, and The supporting surface may include a concave surface.

The supporting surface may be formed as an inner circumferential surface of the housing, and the inner circumferential surface may be configured as a cam profile surface.

The inner circumferential surface of the housing is formed as an ellipse, and an outer circumferential surface of the housing is formed as an circle. According to an aspect of the present disclosure, there is provided a tilting-pad bearing including: a plurality of tilting pads, each of the plurality of tilting pads having a tilting surface; and a housing having a plurality of supporting surfaces for supporting the tilting surface of each of the plurality of tilting pads. Each of the plurality of supporting surfaces or the tilting surface is configured as a cam profile so that the plurality of tilting pads are tilted along a curvature in response to the rotor rotating.

Other particulars of the present disclosure will be described in the detailed description with reference to the accompanying drawings.

According to exemplary embodiments at least following effects can be achieved:

According to an exemplary embodiment of the present disclosure, because the tilting surface of each of the tilting pads or the supporting surface of the housing is configured as a cam profile surface, the tilting pads can move smoothly in the transition section (i.e., from the rise to the dwell or from dwell to the fall as shown in FIG. 2), thereby reducing the wear occurring between the tilting surface of each of the tilting pads and the supporting surface of the housing.

It should be noted that effects of the present disclosure are not limited to those described above and other effects of the present disclosure will be apparent to those skilled in the art from the following descriptions.

BRIEF DESCRIPTION OF THE DRAWINGS

The above and/or other aspects and features of the present disclosure will become more apparent by describing in detail exemplary embodiments thereof with reference to the attached drawings, in which.

DETAILED DESCRIPTION

Figure 1:
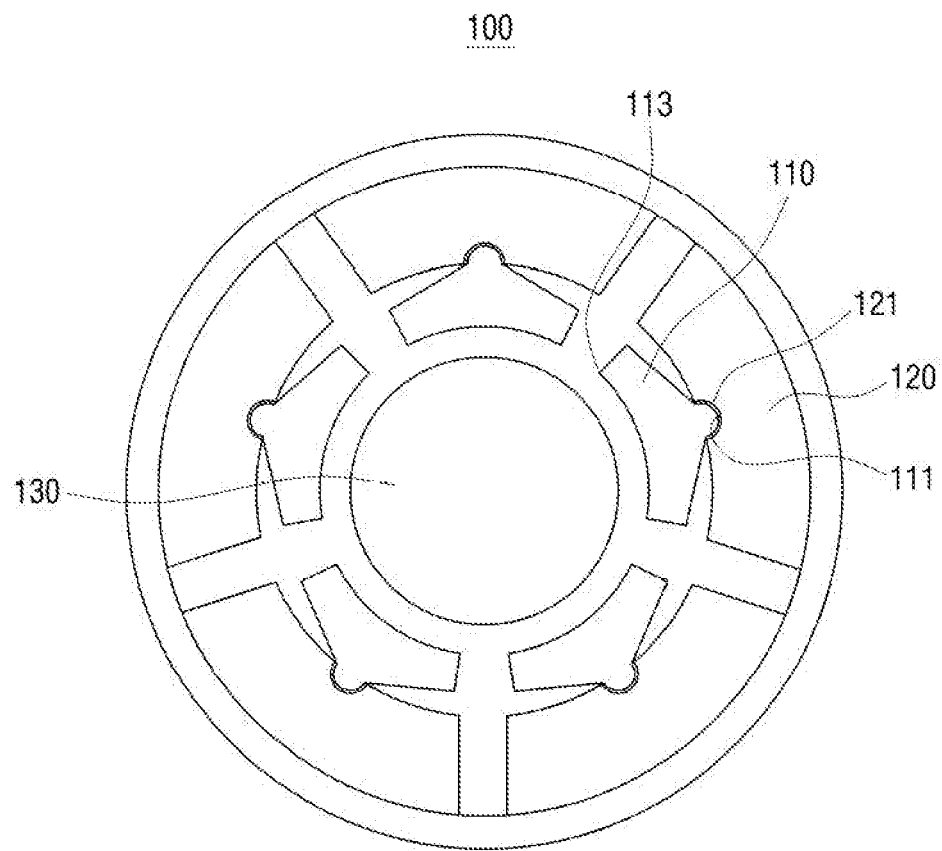
FIG. 1 illustrates a tilting-pad bearing of the related art.
Figure 2:
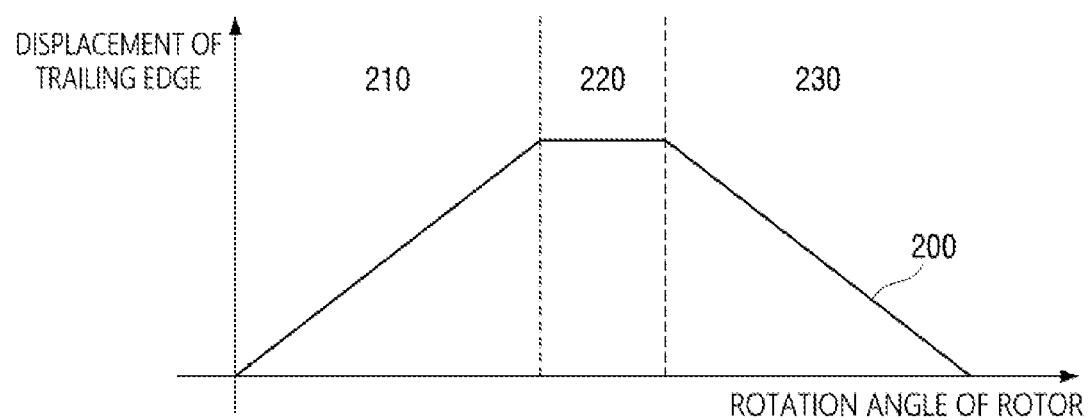
FIG. 2 illustrates a displacement of a trailing edge of a tilting pad relative to the magnitude of a rotation angle of a rotor in a tilting-pad bearing of the related art shown in FIG. 1.

Advantages and features of the present disclosure and methods to achieve them will become apparent from the descriptions of exemplary embodiments hereinbelow with reference to the accompanying drawings. However, the inventive concept of the disclosure is not limited to exemplary embodiments disclosed herein but may be implemented in various different ways. The exemplary embodiments are provided for making the disclosure of the inventive concept thorough and for fully conveying the scope of the inventive concept to those skilled in the art. It is to be noted that the scope of the inventive concept is defined only by the claims set forth below. Like reference numerals denote like elements throughout the descriptions.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

Terms used herein are for illustrating the exemplary embodiments rather than limiting the present disclosure. As used herein, the singular forms are intended to include plural forms as well, unless the context clearly indicates otherwise. Throughout this specification, the word "comprise" and variations such as "comprises" or "comprising," will be understood to imply the inclusion of stated elements but not the exclusion of any other elements.

Hereinafter, exemplary embodiments of the present disclosure will be described in detail with reference to the accompanying drawings.

Figure 3:
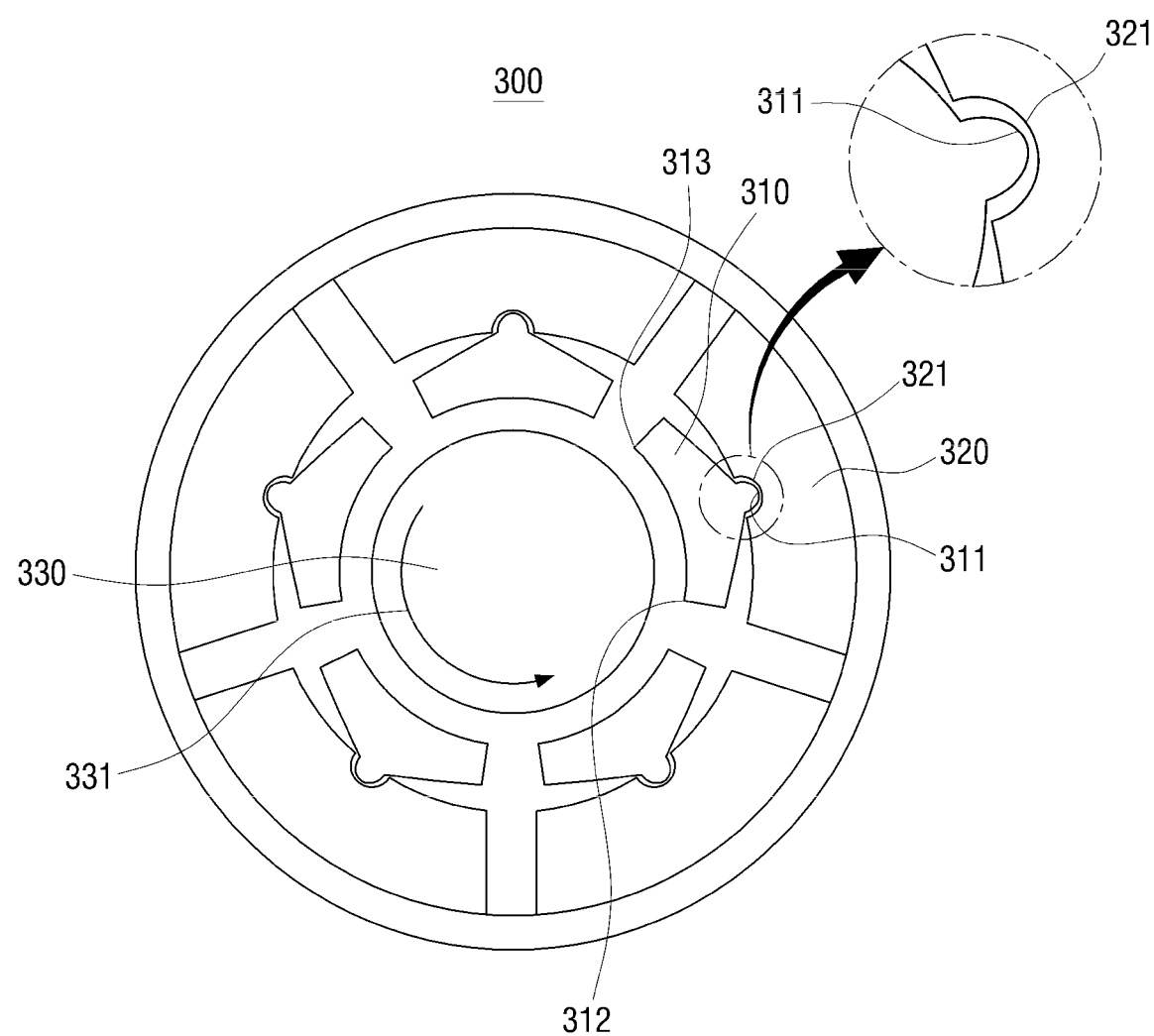
FIG. 3 illustrates a tilting-pad bearing according to an exemplary embodiment.

FIG. 3 shows a tilting-pad bearing 300 according to an exemplary embodiment. The tilting-pad bearing 300 according to an exemplary embodiment may include a plurality of tilting pads 310 and a housing 320 supporting the plurality of tilting pads 310.

As shown in FIG. 3, the plurality of tilting pads 310 are configured to rotatably support a rotor 330. Each of the plurality of tilting pads 310 may include a trailing edge 313 located at a front end of the rotor 330 in a rotation direction 331, a leading edge 312 located at a rear end opposite to the front end of the rotor in the rotation direction 331, and a tilting surface 311 supported by the housing 320.

The housing 320 supports the plurality of tilting pads 310 to allow the tilting pads 310 to be tilted. The housing 320 may include a supporting surface 321 for supporting the tilting surface 311.

In the tilting-pad bearing 300 according to the exemplary embodiment of the present disclosure, the tilting surface 311 may be configured as a cam profile surface, and the supporting surface 321 may be formed in a circular shape. By configuring the tilting surface 311 with the cam profile, the tilting pads 310 work as followers for the cam and are tilted.

Figure 4:
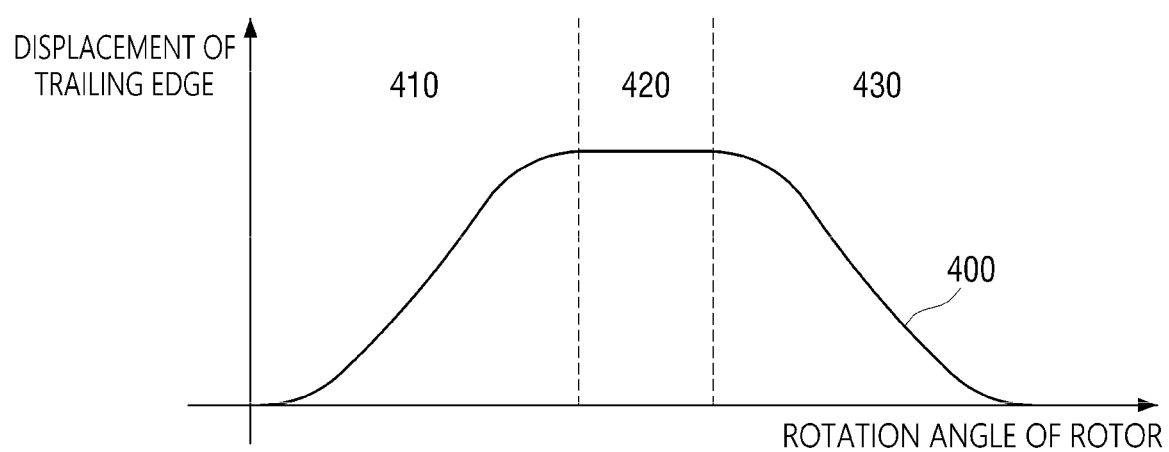
FIG. 4 illustrates a displacement of a trailing edge relative to the magnitude of a rotation angle of a rotor in a tilting-pad bearing according to an exemplary embodiment.

The cam profile may be designed taking into account the displacement drawn by the tilting pad 310 as a tilting pad 310 of the plurality of tilting pads 310 is tilted. For example, the cam profile may be designed such that a trailing edge 313 of the tilting pad 310 has the displacement as shown in FIG. 4. FIG. 4 illustrates the displacement of the trailing edge 313 relative to the magnitude of the rotation angle of the rotor 330. The displacement of the trailing edge 313 in FIG. 4 follows a cycloid curve at the rise 410 and the fall 430. That is to say, according to the design intent of the cam profile, the tilting pads 310 may be tilted in a cycloid motion.

When the cam profile is designed as described above, the plurality of tilting pads 310 can be tilted smoothly in the transition section (from the rise 410 to the dwell 420 or from the dwell 420 to the fall 430, and so on). In addition, as the plurality of tilting pads 310 are tilted while drawing a cycloid curve at the rise 410 and the fall 430, the tilting pads 310 can be smoothly accelerated/decelerated even if a large force is abruptly applied to the plurality of tilting pads 310. Therefore, the wear between the tilting surface 311 of the tilting pad 310 and the supporting surface 321 of the housing 320 can be reduced in compared with the tilting pads of the related art.

The cam profile may be designed to have a simple harmonic motion or a constant acceleration motion, in addition to the tilting pads 310, which are followers, in the cycloid motion.

Figure 5:
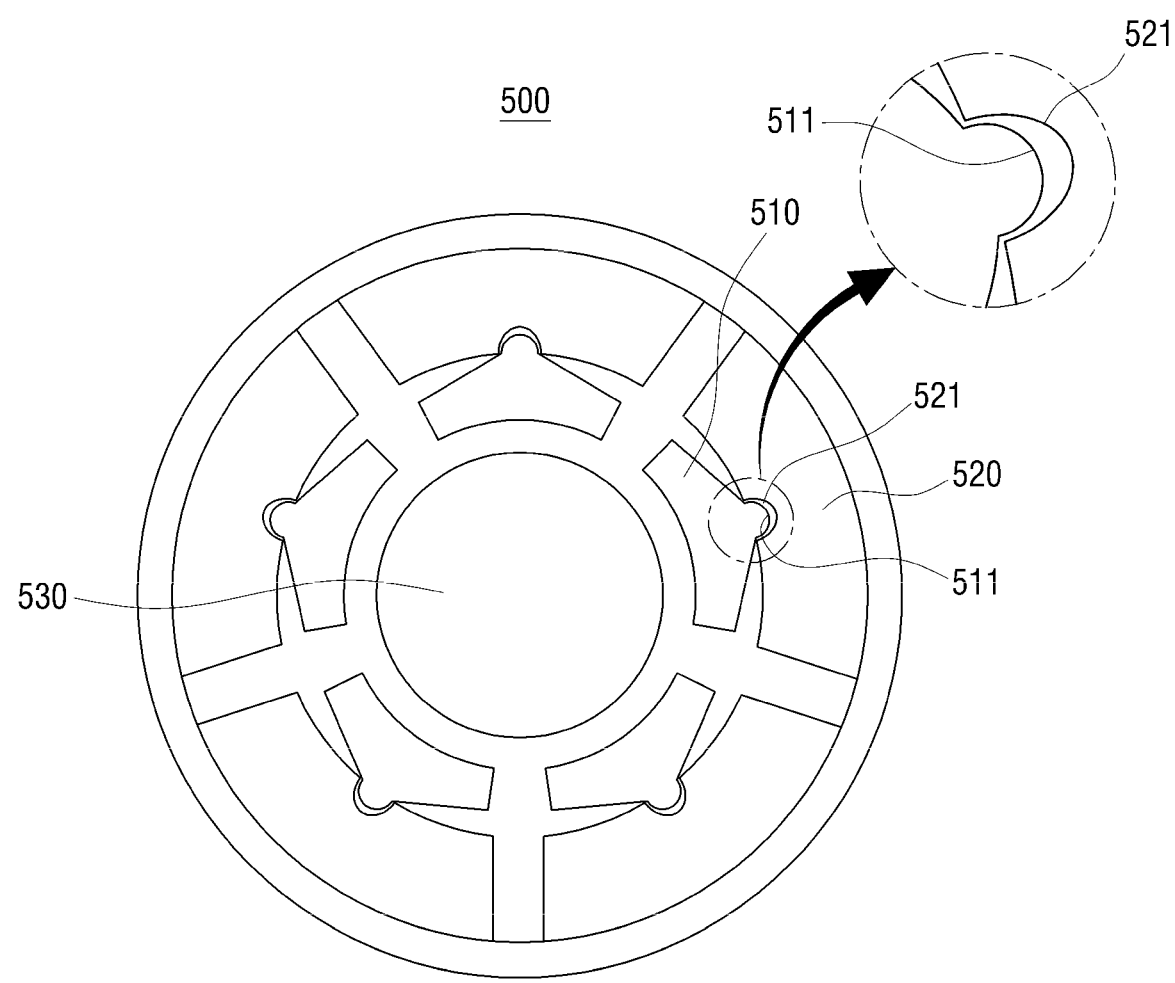
FIG. 5 illustrates a tilting pad bearing according to another exemplary embodiment.

FIG. 5 illustrates a tilting-pad bearing according to another exemplary embodiment. In the tilting-pad bearing 300 according to the previous exemplary embodiment of FIG. 3, the tilting surface 311 of the tilting pad 310 is configured with the cam profile and the supporting surface 321 of the housing 320 has a circular shape. In contrast, in a tilting-pad bearing 500 according to this exemplary embodiment in FIG. 5, a tilting surface 511 of the tilting pad 510 has a circular shape and a supporting surface 521 of the housing 520 is configured as a surface having a cam profile.

In the tilting-pad bearing 500 according to this exemplary embodiment, the supporting surface 521 of the housing 520 is configured as a cam profile surface, and accordingly the tilting pad 510 operates as a follower for the cam and are tilted.

Accordingly, as the rotor 530 rotates, the plurality of tilting pads 510 can be tilted smoothly, and the wear between the tilting surface 511 of the tilting pad 510 and the supporting surface 521 of the housing 520 can be reduced in comparison with the tilting-pad bearing of the related art.

Figure 6:
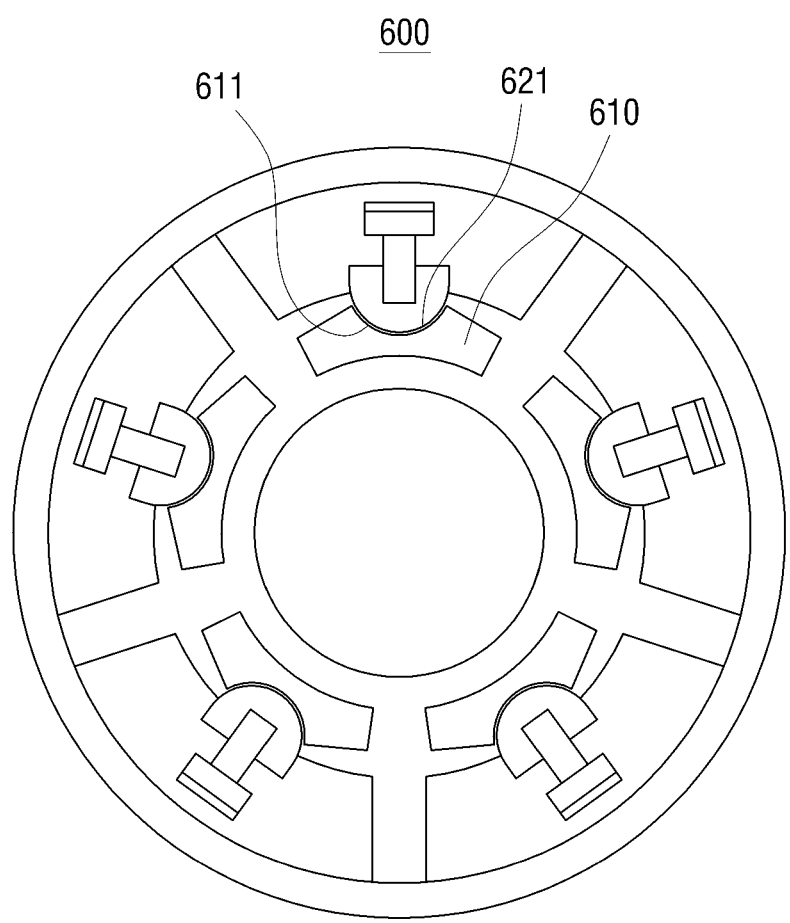
FIG. 6 illustrates a tilting-pad bearing according to yet another exemplary embodiment.

FIG. 6 illustrates a tilting-pad bearing according to yet another exemplary embodiment. In the tilting-pad bearing 300 according to the previous exemplary embodiments shown in FIG. 3 and in FIG. 5, the tilting surfaces 311 and 511 are formed as convex surfaces whereas the supporting surfaces 321 and 521 are formed as concave surfaces. In contrast, in the tilting-pad bearing 600 according to this exemplary embodiment in FIG. 6, a pivot surface 611 of the tilting pad 610 is formed as a concave surface while a supporting surface 621 of the housing 620 is formed as a convex surface.

In the tilting-pad bearing according to this exemplary embodiment in FIG. 6, the pivot surface 611 of the tilting pad 610 may be configured with the cam profile, and the supporting surface 621 of the housing 620 may be formed in a circular shape. Like the previous exemplary embodiment shown in FIG. 3, by configuring the pivot surface 611 of the tilting pad 610 with the cam profile, the plurality of tilting pads 610 operate as followers for the cam and may be tilted smoothly.

Alternatively, in the tilting-pad bearing according to the exemplary embodiment in FIG. 6, the pivot surface 611 of the tilting pad 610 may be formed in a circular shape and the supporting surface 621 of the housing 620 may be configured with the cam profile. Like the previous exemplary embodiment shown in FIG. 5, by configuring the supporting surface 621 of the housing 620 with the cam profile, the tilting pads 610 may operate as followers for the cam and may be tilted smoothly.

Accordingly, also in the tilting-pad bearing 600 according to the exemplary embodiment in FIG. 6, the plurality of tilting pads 610 can be tilted smoothly, and accordingly the wear between the tilting surface 611 and the supporting surface 621 can be reduced in comparison with the tilting-pad bearing of the related art.

Figure 7:
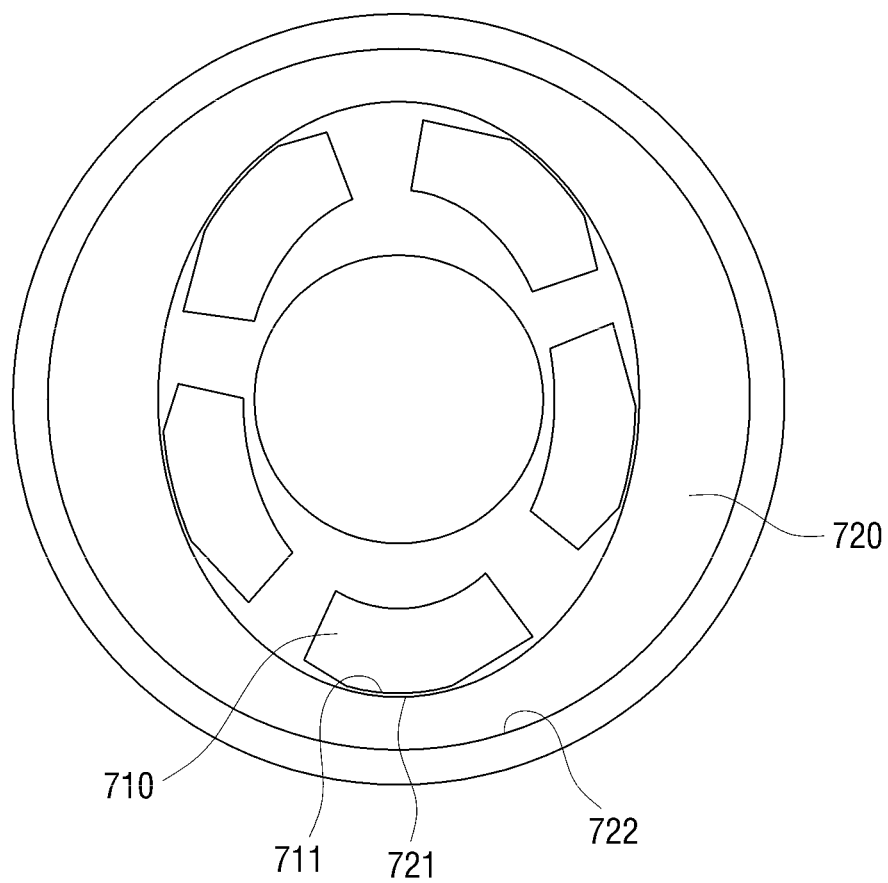
FIG. 7 illustrates a tilting pad bearing according to yet another exemplary embodiment.

FIG. 7 illustrates a tilting-pad bearing 700 according to yet another exemplary embodiment. The tilting-pad bearing 700 according to this exemplary embodiment has a different shape in comparison with the tilting-pad bearings 300, 500 and 600 according to the previous exemplary embodiments of the present disclosure.

In the tilting-pad bearing 700 according to this embodiment of FIG. 7, the tilting surface 711 of each of the plurality of tilting pads may have a circular shape while the inner circumferential surface 721 of the housing 720 may be configured as a cam profile surface. The outer circumferential shape 722 of the housing may have a circular shape so that the appearance of the tilting-pad bearing looks like typical bearings. As the inner circumferential surface 721 of the housing is configured with the cam profile, the plurality of tilting pads 710 operate as followers for the cam and are tilted, so that the tilting pads 710 can be tilted smoothly.

Thus far, tilting-pad bearings according to exemplary embodiments of the present disclosure have been described above, in which the tilting pads can be tilted smoothly. It will be evident to those skilled in the art that the present disclosure can be applied to other tilting-pad bearings than the above-described exemplary embodiments without departing from the technical idea or the gist of the present disclosure.

Although example embodiments have been described, it will be understood by those skilled in the art that various changes and modifications may be made without departing from the technical spirit and essential feature of the present disclosure. Accordingly, all such modifications are intended to be included within the scope of the present disclosure as defined in the claims.

What is claimed is:

1. A tilting-pad bearing for supporting a rotor, comprising:
   a tilting pad having a tilting surface; and
   a housing having a supporting surface supporting the tilting surface,
   wherein one of the tilting surface and the supporting surface is configured as a cam profile surface so that the tilting pad is tilted along a curvature, around where the supporting surface supports the tilting surface, in response to the rotor rotating,
   wherein the cam profile surface has an elliptical shape, other than a circular shape, and
   wherein the other one of the tilting surface and the supporting surface is formed in a circular shape.

2. The tilting-pad bearing of claim 1, wherein the cam profile surface is configured such that the tilting pad is tilted in a cycloid motion.

3. The tilting-pad bearing of claim 2, wherein the tilting pad comprises:
   a trailing edge located at a front end of the tilting pad in a rotation direction of the rotor; and
   a leading edge located at a rear end opposite to the front end of the tilting pad in the rotation direction.

4. The tilting-pad bearing of claim 3, wherein a displacement of the trailing edge is changed according to a rotation angle of the rotor.

5. The tilting-pad bearing of claim 4, wherein the displacement of the trailing edge forms a cycloid curve.

6. The tilting-pad bearing of claim 4, wherein the tilting pad is tilted according to a cycloid curve motion of the displacement of the trailing edge.

7. The tilting-pad bearing of claim 1, wherein the tilting surface comprises a concave surface, and
   wherein the supporting surface comprises a convex surface.

8. The tilting-pad bearing of claim 1, wherein the tilting surface comprises a convex surface, and
   wherein the supporting surface comprises a concave surface.

9. The tilting-pad bearing of claim 1, wherein the supporting surface is formed as an inner circumferential surface of the housing, and the inner circumferential surface is configured as the cam profile surface.

10. A tilting-pad bearing for supporting a rotor, comprising:
    a tilting pad having a tilting surface; and
    a housing having a supporting surface supporting the tilting surface,
    wherein one of the tilting surface and the supporting surface is configured as a cam profile surface so that the tilting pad is tilted along a curvature in response to the rotor rotating,
    wherein the supporting surface is formed as an inner circumferential surface of the housing, and the inner circumferential surface is configured as the cam profile surface, and
    wherein the inner circumferential surface of the housing is formed as an ellipse, other than a circle, and an outer circumferential surface of the housing is formed as a circle.

11. A tilting-pad bearing for supporting a rotor, comprising:
    a plurality of tilting pads, each of the plurality of tilting pads having a tilting surface; and
    a housing having a plurality of supporting surfaces for supporting the tilting surface of each of the plurality of tilting pads,
    wherein each of the plurality of supporting surfaces or the tilting surfaces is configured as a cam profile so that the plurality of tilting pads are tilted along a curvature, around where the plurality of supporting surfaces support the tilting surfaces, respectively, in response to the rotor rotating, wherein the cam profile has an elliptical shape, other than a circular shape, and wherein the other one of the tilting surface and the supporting surface is formed in a circular shape.

12. The tilting-pad bearing of claim 11, wherein the cam profile is configured such that the plurality of tilting pads are tilted in a cycloid motion.

13. The tilting-pad bearing of claim 12, wherein each of the plurality of tilting pads comprises:
 a trailing edge located at a front end of the tilting pad in a rotation direction of the rotor; and
 a leading edge located at a rear end opposite to the front end of the tilting pad in the rotation direction.

14. The tilting-pad bearing of claim 13, wherein a displacement of the trailing edge is changed according to a rotation angle of the rotor.

15. The tilting-pad bearing of claim 14, wherein the displacement of the trailing edge forms a cycloid curve.

16. The tilting-pad bearing of claim 14, wherein the plurality of tilting pads are tilted according to a cycloid curve motion of the displacement of the trailing edge.

17. The tilting-pad bearing of claim 11, wherein the tilting surface is formed as a concave surface, and
 wherein each of the plurality of supporting surfaces is formed as a convex surface.

18. The tilting-pad bearing of claim 11, wherein the tilting surface is formed as a convex surface, and
 wherein each of the plurality of supporting surfaces is formed as a concave surface.

* * * * *